United States Patent
Khan et al.

(10) Patent No.: US 10,425,451 B2
(45) Date of Patent: Sep. 24, 2019

(54) HANDLING CALL WAITING, MULTIPLE CALLS, AND HOLD/RESUME USING WEB REAL-TIME COMMUNICATIONS TECHNOLOGY

(71) Applicant: Vodia Networks, Inc., Woburn, MA (US)

(72) Inventors: Muhammad Asad Khan, Reading, MA (US); Christian Stredicke, Winchester, MA (US); Jonathan Monsarrat, Cambridge, MA (US)

(73) Assignee: Vodia Networks, Inc., Woburn, MA (US)

( * ) Notice: Subject to any disclaimer, the term of this patent is extended or adjusted under 35 U.S.C. 154(b) by 22 days.

(21) Appl. No.: 15/617,044

(22) Filed: Jun. 8, 2017

(65) Prior Publication Data

US 2017/0359390 A1    Dec. 14, 2017

Related U.S. Application Data

(60) Provisional application No. 62/348,239, filed on Jun. 10, 2016.

(51) Int. Cl.
*H04L 29/06*    (2006.01)

(52) U.S. Cl.
CPC ........ *H04L 65/1096* (2013.01); *H04L 65/103* (2013.01); *H04L 65/105* (2013.01);
(Continued)

(58) Field of Classification Search
CPC .............. H04L 65/403; H04L 65/1059; H04L 65/1069; H04L 65/1089; H04L 67/025;
(Continued)

(56) References Cited

U.S. PATENT DOCUMENTS

| 2008/0014938 A1* | 1/2008 | Hart ...................... H04W 76/20 455/435.1 |
| 2008/0152116 A1* | 6/2008 | Sylvain ............... H04M 3/4285 379/216.01 |

(Continued)

OTHER PUBLICATIONS

Altanai, WebRTC Integrator's Guide, Oct. 2014, Packt Publishing, pp. 1-382 (Year: 2014).*

(Continued)

*Primary Examiner* — Michael Thier
*Assistant Examiner* — Prince A Mensah
(74) *Attorney, Agent, or Firm* — Cesari and McKenna, LLP

(57) ABSTRACT

A server-side telephone system that accepts Web browser calls. The telephone system can act as an intermediary between multiple call participants, even though each is limited to a single peer to peer connection. This allows providing an interface that enables Web browser call participants to put a call on hold, resume a call from hold, receive an inbound call while already on an existing call, and merge calls into a conference session. The telephone system permits calls to be translated outside the original caller's Web browser call domain, such as to an old telephone network landline, cellular network, Voice over IP network, or other call domain. Media exchanged between parties may include Web browser call participant data for interactive sessions. Conversions between media that are necessary to connect call participants with different systems are possible. Call sessions that are put on hold may be connected to an automated system that provides media, for example "on hold" music.

11 Claims, 10 Drawing Sheets

(52) U.S. Cl.
CPC ...... *H04L 65/1046* (2013.01); *H04L 65/1069* (2013.01); *H04L 65/403* (2013.01); *H04L 65/605* (2013.01); *H04L 65/608* (2013.01)

(58) Field of Classification Search
CPC ... H04L 65/103; H04L 65/105; H04L 65/605; H04L 65/608; H04L 65/1046; H04L 65/1096
See application file for complete search history.

(56) References Cited

U.S. PATENT DOCUMENTS

| | | | | |
|---|---|---|---|---|
| 2008/0205267 | A1* | 8/2008 | El Barachi | H04L 65/1069 370/230 |
| 2011/0191696 | A1* | 8/2011 | Jain | G06F 15/16 715/758 |
| 2011/0247045 | A1* | 10/2011 | Rajagopal | H04L 63/08 726/1 |
| 2014/0122600 | A1 | 5/2014 | Kim et al. | |
| 2014/0126715 | A1 | 5/2014 | Lum et al. | |
| 2014/0333713 | A1* | 11/2014 | Shoemake | H04L 65/1069 348/14.05 |
| 2014/0348044 | A1 | 11/2014 | Narayanan et al. | |
| 2016/0021336 | A1* | 1/2016 | Abbott | H04M 1/72572 348/14.02 |

OTHER PUBLICATIONS

Kaplan, et al., Requirements for Interworking WebRTC with Current SIP Deployments draft-kaplan-rtcweb-sip-interworking-requirements-02, Network Working Group, Internet Draft, Nov. 22, 2011, 21 pages.

Twilio datasheet—VoIP API to Embed Voice into Web & Mobile Apps, retrieved from the Internet Jun. 7, 2017, https://www.twilio.com/webrtc, 5 pages.

Twilio datasheet—VoIP API & SDKs for iOS & Android Mobile Apps, retrieved from the Internet Jun. 7, 2017, https://www.twilio.com/client/sip-to-webrtc, 4 pages.

* cited by examiner

Mixed Video and Audio 611

HANDLING CALL WAITING, MULTIPLE CALLS, AND HOLD/RESUME USING WEB REAL-TIME COMMUNICATIONS TECHNOLOGY

CROSS-REFERENCE TO RELATED APPLICATIONS

This application claims priority to and the benefit of U.S. Provisional Patent Application Ser. No. 62/348,239, filed on Jun. 10, 2016, entitled "HANDLING CALL WAITING, MULTIPLE CALLS, AND HOLD/RESUME USING WEB REAL-TIME COMMUNICATIONS TECHNOLOGY," and which is hereby incorporated by reference in its entirety.

BACKGROUND

For some time, telephone users expect certain features to be available. For example, they expect to place calls on hold, make multiple calls at the same time, receive multiple calls with a call waiting alert, put some callers on hold and resume them, merge calls, and other features. As one example, a user might expect to:
  Place a first call,
  Put that call on hold,
  Place a second call,
  Receive an incoming call alert,
  Accept the incoming third call, which puts any active call on hold,
  Drop the third call,
  Resume the first call from hold, and
  Merge the remaining two callers into a three-way conference call.

Web communications technology now makes it possible to make telephone calls through a web browser. This is enabled by technologies such as SRTP (Secure Real-Time Transport Protocol), which is one method for exchanging real-time media.

These calls are placed over the Internet rather than through traditional telephone lines, though a call that begins on the Internet may be redirected into traditional telephone lines. This is useful because Internet calls are less expensive than traditional telephone calls, and any software that runs on Web browsers is device-independent. Web browsers are in a sense a new type of highly portable operating system on which many applications, including Web communications, can run regardless of which device is being used.

Web browsers also create a secure environment that protects the underlying device on which they run from the applications that run inside the browser. Also Web browsers may record and present audio and video that is transmitted using a variety of formats, using Coders-Decoders ("codecs"), depending on what underlying device is involved. The hundreds of platforms that can run Web browsers and the dozens of Web browser implementations result in an overwhelming possibility of security and codec mismatched combinations when a call is placed from one Web browser to another.

Because of this, every time a call is placed from one Web browser to another, it must negotiate the security and codec protocols that are to be used. The two ends need to be using compatible protocols to authenticate and to send audio and video. They need to "speak the same language". Only then can the call be connected over the Internet as voice packets.

SUMMARY

Perhaps because of this complication, Web browser calling technologies only permit a single connection to be made at a time per browser tab. Using multiple tabs to manage multiple calls is confusing and does not allow for a consolidated user interface in a single tab, nor for call merging. The multiple call features that users expect are unavailable, but should be provided.

Briefly, the system and methods described herein are based on an intermediary exchange server (which we also call the "central telephone system") that allows a user to coordinate multiple Web browser calls.

Traditionally, a Web browser caller client connects directly peer-to-peer with another Web caller client. However, in our new approach, the Web caller client connects instead to a central telephone system running on a server. The server-side telephone system has been specially adapted to handle multiple connections and acts as an intermediary that:
  Receives the connection from the Web browser caller,
  Connects to the Web browser call recipient,
  Negotiates session parameters such as media formats, security keys, and hidden IP addresses, and
  Serves as an intermediary media channel, so that audio and video between Web browser caller and Web browser call recipient passes through the telephone system.

In one example implementation, a Web browser caller establishes a first call to a first call recipient via an Internet connection to the server-side telephone system. This session may be established with Web Real-Time Communication ("WebRTC") or some other communications protocol and/or application programming interface that enables real-time communication over peer-to-peer connections. This connection enables the Web browser to request resources from the Telephone System server.

The Telephone System also negotiates a call session for the call recipient, and connects the two sessions. This second call session may be established with another Web browser connection. However, it may also be a Voice over IP (VoIP) connection, via a Plain Old Telephone System (POTS), or some other way.

When the original Web browser caller wants to initiate a second call, she is completely disconnected with the first call, but the central telephone system maintains its media connection to the first caller, for example to play pleasant elevator music to indicate the call is on hold. The central telephone system also maintains the same impression of being on hold for the first call recipient. In this way, the first call recipient also does not perceive the Web browser call to be dropped, when in fact it has.

The central telephone system stores the original signaling information, containing for example the public keys and IP addresses of the first caller and first call recipient. If the original Web browser user wants to remove the first call from hold, the media channel is not interrupted, but a fresh session is set up. The telephone system stops playing elevator music on hold and returns to being the media intermediary between Web browser caller and the call recipient. The fresh call appears to be merely a resumption of a call on hold.

The central telephone system also juggles media connections for conference calls, renegotiate codecs to optimize a conference call, facilitates peer-to-peer calling, and can connect Web browser calls to VoIP phones, soft phones, other telephone systems, and old network telephones such as landlines and cell phones.

Thus, even though a Web browser caller is limited to one Web browser real-time connection at a time, she can make, receive, and place on hold several calls simultaneously.

The challenges are then:
  (a) How should disconnected session information be saved and used?

(b) How should conference calls be handled?

(c) What is the best interface for a user to manage multiple calls?

(d) When should media formats, called codecs, be renegotiated?

These problems are solved with a method according to a preferred embodiment in the following way:

(a) By acting as a signaling intermediary, the telephone system has access to both the caller and call recipient IP addresses, and all the negotiated session information including Caller ID, From Field, To Field, and more. This information can be saved to a database when a call is placed on hold, and loaded from the database to re-establish a connection.

(b) By acting as a media intermediary, the telephone system can receive incoming video, audio, and data signals from several sources and mix them together into a single media stream that is then sent to each party in the call.

(c) When the user opens an HTML page in her Web browser to initiate the call, this same HTML page can have a Web-based user interface for managing multiple calls, but other interfaces such as voice commands and telephone keypad commands could also be used.

(d) When acting as a media intermediary, the telephone server may need to convert audio and from one incoming codec to another outgoing codec. This can be a CPU-intensive operation. If multiple callers merge onto a single conference call, renegotiating the codecs may help to minimize or eliminate such conversions, for example by getting all call participants to use the same codecs, or by getting all participants to switch to the codec of whomever is making the most use or most difficult use of the video channel.

BRIEF DESCRIPTION OF THE DRAWINGS

The foregoing and other features, and advantages will be apparent from the following more particular description of preferred embodiments, as illustrated in the accompanying drawings.

FIG. 1 shows what a Web page with Web calling controls might look like.

DETAILED DESCRIPTION OF PREFERRED EMBODIMENTS

A description of preferred embodiments follows.

Overview

This preferred embodiment relates to calls placed through a Web browser. Unlike the standard approach to Web calling, which are normally limited to a single peer-to-peer connection per browser tab, using the approaches described herein, a Web caller instead connects "client-to-server" to a central telephone system. Now the telephone system can connect her to a call recipient of her choice. If she wishes to put the call on hold, the telephone system maintains the impression of the connection still being active, perhaps by playing "on hold" music to both the Web caller and the call recipient, while the Web caller may actually be disconnected so that she may call a second person. If she wants to merge calls into a single conference, the telephone system merges multiple calls into a single session. The telephone system can reach outside the world of Web calling inside its domain, into VoIP, old telephony networks, and even other Web calling domains. It thus acts as an intermediary not only for audio, but also video, other kinds of media, and other kinds of data, multiplexing everything into that single connection to the original Web browser caller. While this is all happening, the telephone system makes clever choices about media formats to minimize conversion costs, latency, and bandwidth.

More particularly, the methods and systems described herein permit making and receive multiple WebRTC calls to and from other WebRTC clients, as well as to Session Initiation Protocol (SIP) user agents through an SIP entity or directly. The methods and systems enable any number of calls to be placed on hold while a current call is connected to one destination, and any of the calls may be resumed from a list of held calls while the current call goes on hold.

With WebRTC it has not previously been possible to make or receive multiple calls; or to talk to one person while others are on hold; or to be able to resume any of the held calls.

The methods and systems described herein provide by disconnecting the WebRTC side of a call that is to be held between the WebRTC client and the SIP entity, while maintaining the signaling information in the WebRTC client and the complete call in the SIP entity in the hold state, so that the other party hears music on hold (MOH). That way when the call is being resumed later, the SIP information may be used to resume the call by making a fresh WebRTC call (including DTLS) between the WebRTC client and the SIP entity that connects to the existing call being held in the SIP entity.

Managing Calls

Figure 1:
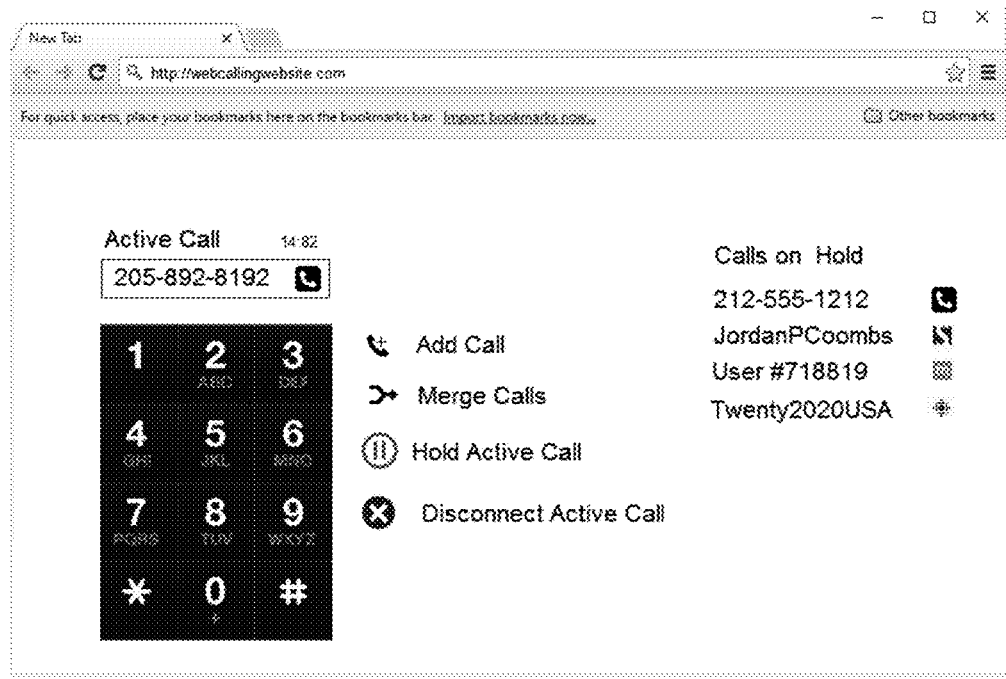

FIG. 1 shows an user interface for how calls may be set up and managed.

In this diagram:

The user opened Google Chrome.

The user visited http://webcallingwebsite.com, which could be any web address. This loads an HTML page into the user's browser.

Part of the HTML page contains the displayed user interface for making multiple Web calls, which could be in a dedicated window as displayed.

An interface shows that there are five calls being managed:

An active call is going to a traditional phone line, 202-892-8192, which happens to be a landline on the Sprint™ network, A call on hold going to a traditional phone line, 212-555-1212, which happens to be a cell phone on the Verizon™ network, A call on hold going to user JordanPCoombs on a VoIP service with a red 'S' icon, A call on hold going to user User #718819 on MongoCall™, a Web browser calling service with an 'm' icon, and A call on hold going to user Twenty2020USA™.

The HTML page presents control options including:
- Add Call, which places the currently active call on hold and allows the user to dial a new phone number or look up a user on a VoIP service,
- Merge Calls, which places two or more of the calls on hold into a conference call together,
- Hold Active Call, which places the active call on hold, and
- Disconnect Active Call, which drops the active call.

Many other control options would be possible, including:
- Setting the outbound Caller ID to a different phone number, using two phone numbers simultaneously, logging in as different usernames on the same VoIP service, or using different VoIP services,
- Hosting separately merged and different conference calls simultaneously,
- Audio and video controls such as volume and contrast,
- Transferring calls, and
- Chat, videoconferencing, text message, and other communications options.

Verbose Example of Placing a Web Call

Figure 2:
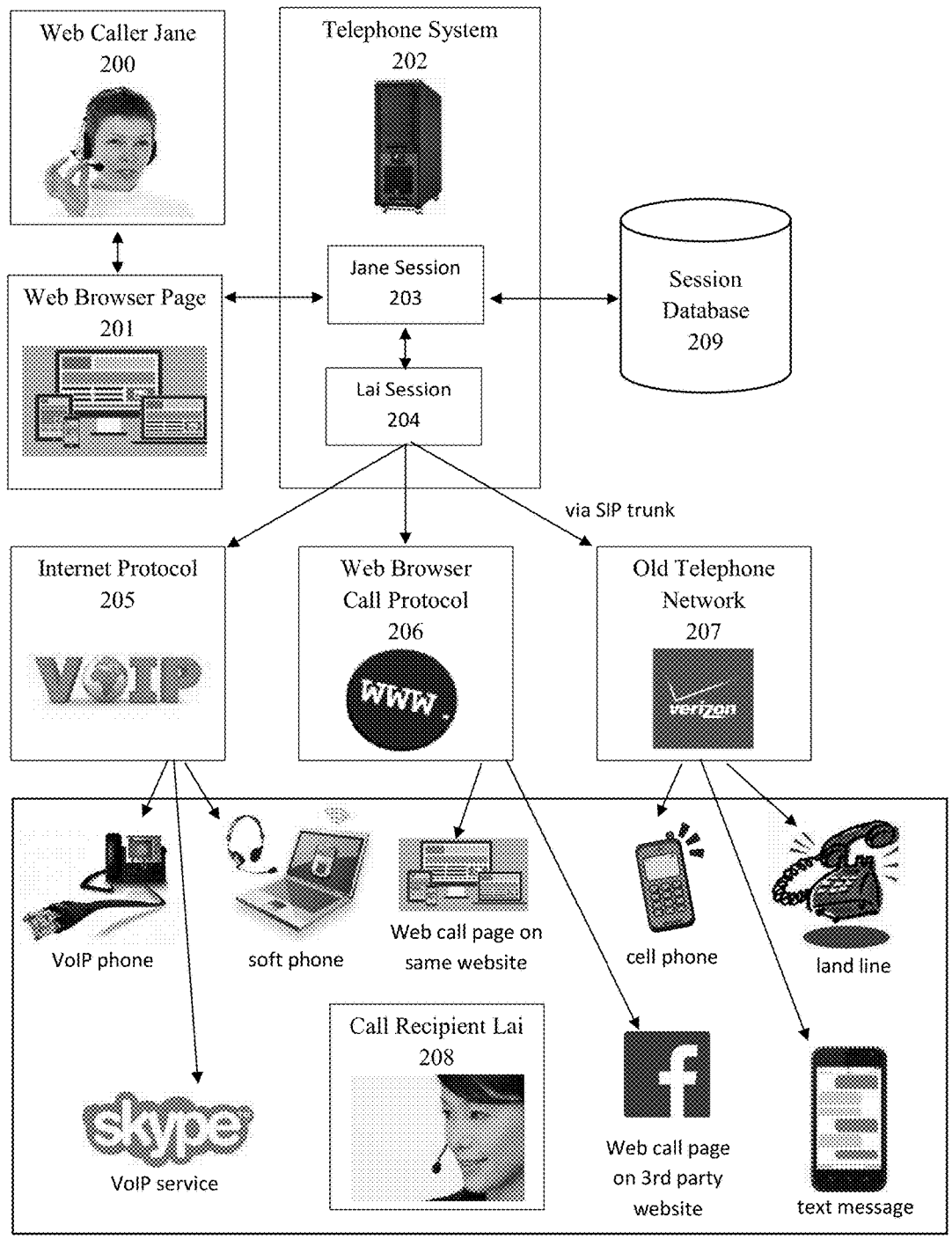
FIG. 2 shows how a Web call is made to a recipient owning any kind of phone.

FIG. 2 gives an example of how multiple calls are routed.

A first Web Caller Jane 200 navigates her Web browser to a web page such as http://webcalls.vodia.com. The publicly listed domain registrar for webcalls.vodia.com sends her HTML request to Telephone System 202, which is a server-side telephone platform and a Web server. It supplies the HTML response, and a Web Browser Page 201 loads in Jane's browser on her client computer.

Using the interface on the Web Browser Page 201, Jane opens her contacts list and initiates a call to a first Call Recipient Lai 208.

The Web Browser Page 201 begins a Web call negotiation through the Internet to the Web calling software at Telephone System 202, by telling it how it wants to send and receive audio and video. This communication is done using SDP (Session Description Protocol), an Internet communication protocol. In this first step in the negotiation, the Web Browser Page 201 sends media parameters to Telephone System 202 that may include:
- A list of codecs supported by Web Browser Page 201,
- A list of preferred codecs,
- The parameters of each codec,
- Preferred packet length,
- The IP address and port on which it expects the media such as audio and video,
- And possibly other parameters.

The Telephone System 202 then sets up a Call Session for Jane 203. A call session is an ongoing, live connection between two parties that the Telephone System 202 maintains, with parameters that the Telephone System 202 can store in a Session Database 209, including the Web call parameters, Web call data state, and any SIP trunk parameters.

Then the Telephone System 202 reaches out to Call Recipient Lai 208, via a different connection. Call Recipient Lai 208 could be using a phone of any type, for example:
- If Call Recipient Lai 208 is using a Web browser to receive the call, which could be also hosted on a service such as webcalls.vodia.com or on some other service such as Facebook.com™, the Telephone System 202 connects to her via Web Browser Protocol Call 206 over the Internet,
- If Call Recipient Lai 208 is using a VoIP phone or soft phone, the Telephone System 202 sets up media to flow directly through an Internet Protocol 205,
- If Call Recipient Lai 208 is using an old telephone network phone, such as a cell phone, land line, PBX telephone system, or is being sent an SMS text message, the Telephone System 202 sends media through a SIP trunk to an Old Telephone Network 207 company such as Verizon,
- If Call Recipient Lai 208 works for a company that has a second telephone system, then the call is placed through an old telephone network company to the telephone system, which may respond in any way, such as having an automated attendant pick up or may transfer all calls to Lai's cell phone.

The Telephone System 202 passes along caller identification information to Call Recipient Lai 304 of whatever form is appropriate:
- If Call Recipient Lai 208 is using an old telephone network, she might only see the Caller ID of Web Caller Jane 300.
- If Call Recipient Lai 208 is using a VoIP network or Web browser call system, she sees whatever username and origination service Web Caller Jane 300 is using. For example, MyNameIsLai919 on the Skype™ VoIP network might see that JaneRandall2012 is calling from the Vodia™ Web Caller network.

If Call Recipient Lai 208 or her automated telephone system rejects the call or does not pick up, then Telephone System 202 informs Web Caller Jane 200 of this.

If Call Recipient Lai 208 or her automated telephone system do pick up, then the Telephone System 202 replies to Web Caller Jane 200 with:
- The preferred codecs it chose from the given list, matched to facilitate whatever type of phone system Call Recipient Lai 208 is using, ideally to minimize the CPU costs of converting incoming media from one format to another format as outgoing media, or to eliminate such conversion if Web Caller Jane 200 and Call Recipient Lai 208 can use the same codec for audio or video,
- Packet length,
- The IP address and port on which it expects media,
- And possibly other parameters.

These IP addresses may not be accurate, if the Web Browser Page 201 is on a client machine sitting behind a NAT (Network Address Translation) gateway, part of an Internet firewall. Just like a company can have a main phone number with many different extension numbers, a company with a NAT may have a main IP address but a variety of different and hidden individual addresses. Finding the real IP address is like getting the direct dial phone number for an employee's desk, which allows you to call in directly, bypassing the main corporate phone number.

Web calls may use ICE, Interactive Connectivity Establishment, an Internet protocol, together with a STUN server, to traverse NATs and firewalls and determine the actual IP and port on which the media should be sent to the other side. Of course, both caller and call recipient could be hiding behind a NAT.

Then the Web Browser Page 201 and Telephone System 202 trade encryption keys via the DTLS (Datagram Transport Layer Security) protocol to make a secure media connection possible, through SRTP (Secure Real-Time Protocol).

All of the session information is communicated from the Web Browser Page 201 to the Telephone System 202, and now audio and video can be sent via the Telephone System 202 to Call Recipient Lai 208 and received from her and sent back to Web Browser Page 201 for Web Caller Jane 200.

If Web Caller Jane 200 and Call Recipient Lai 208 are using the same (or compatible) Web browser calling systems, then they can also pass other types of Web call protocol data back and forth through the Telephone System 202. For example, they might play a game of chess with the chess boards displayed on each player's screen, and moves communicated as data packets sent back and forth through the Telephone System 202.

Thus Telephone System 202 has complete control of the session and media channel. To put it simply, Web Caller Jane 200's Web call is routed to and handled by Telephone System 202 as an intermediary to Call Recipient Lai 208.

Putting a Web Call on Hold and Resuming the Call

Figure 3A:
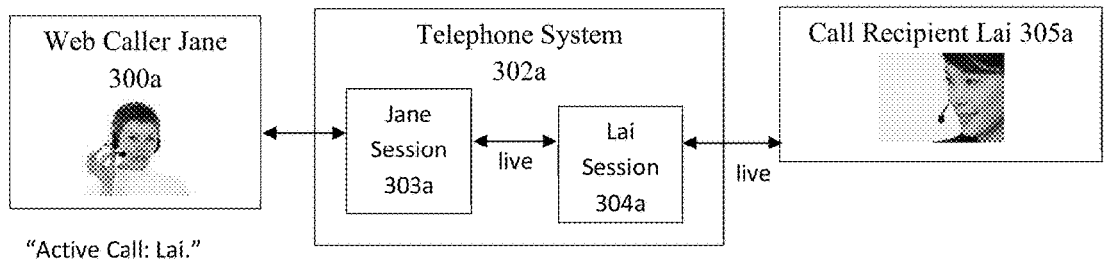
FIG. 3a shows a live Web call to a recipient.

FIG. 3a is analogous to FIG. 2. FIG. 3a is the result after Web Caller Jane 300a clicks to ask Telephone System 302a to place a call to Call Recipient Lai 305a. Telephone System 302a starts Jane Session 303a and Lai Session 304a to control the call to Call Recipient Lai 305a, who may be contacted through any kind of telephone network. Jane's Web browser indicates that she is on a live call with Lai and gives options such as those shown in FIG. 1.

Figure 3B:
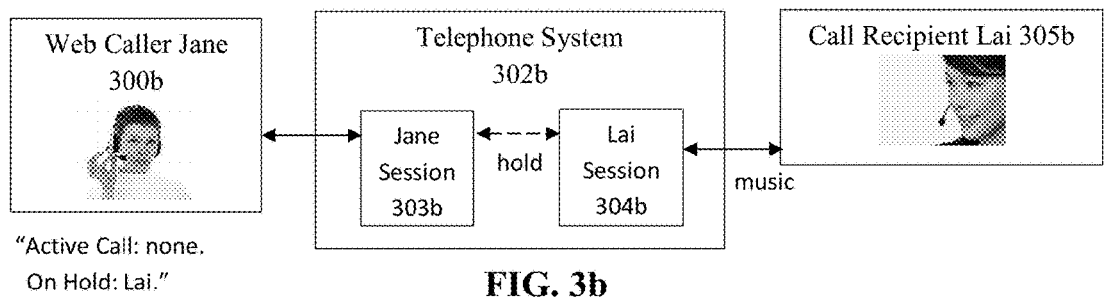
FIG. 3b shows the Web call placed on hold.

Then Web Caller Jane uses her browser interface to put that call on hold, resulting in FIG. 3b.

At this point:
a) Jane's Web call connection to Jane Session 303b could be dropped, and further information such as an incoming calls or that Call Recipient Lai 305b has dropped the call could be handled by WebSockets.
b) Jane's Web call connection to Jane Session 303b could be left open, to communicate such information via data packets or to send "on hold" media to Web Caller Jane 300b, such as the space for Lai's video stream being replaced with a generic video.

In either case, Jane's Web browser indicates that she has no active call and that her call with Lai is on hold. Meanwhile, Call Recipient Lai 305b still has an active connection to her Call Session 304b on Telephone System 302b. Telephone System 302b can continue to send media to Call Recipient Lai 305b such as "on hold" music to create the impression that she is still connected to Jane. Or if Call Recipient Lai 305b is taking the call on her Web browser, then arbitrary HTML code could be sent. For example, perhaps Call Recipient Lai 305b is seeing an advertisement or playing an interactive game served up by Lai Session 304b to her Web browser while Jane has her on hold.

Figure 3C:
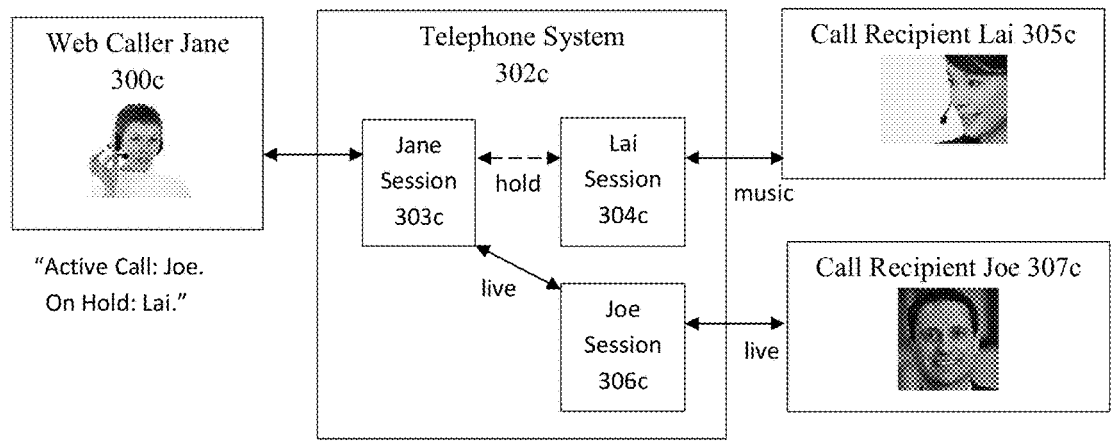
FIG. 3c shows a second Web call connects while the first is still on hold.

Next Web Caller Jane 300c clicks to call a third party, Call Recipient Joe 307c. This new call is placed through Telephone System 302c as before, resulting in FIG. 3c. Jane's Web browser now shows that Joe is the active caller but Lai is still on hold.

Figure 4A:
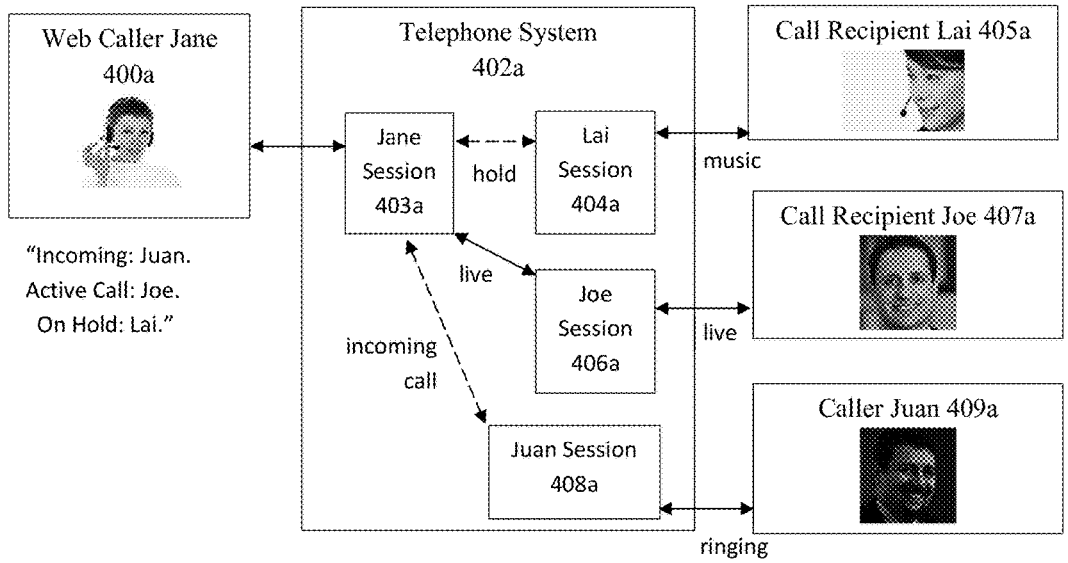
FIG. 4a shows an incoming call that is converted to an incoming Web call.

As shown in FIG. 4a, Caller Juan 409a may then place a call to Web Caller Jane 400a. This call may come in via an old telephone network if Web Caller Jane 400a has a regular phone number, such as 408-555-1212, that is routed to the Telephone System 402a. The Telephone System 402a accepts the call, and informs Web Caller Jane 400a of the incoming call through her Web browser interface.

Meanwhile, Caller Juan 409a may be sent media, such as a ringing dial tone or other media such as the phrase "Calling Now" with Jane's photo and number.

Web Caller Jane 400a could of course reject the call from Caller Juan 409a, which would cause Telephone System 402a terminate the call to Caller Juan 409a or to offer him voicemail options or send other media, such as visual voicemail or an audio announcement that Jane no longer works at this company.

Figure 4B:
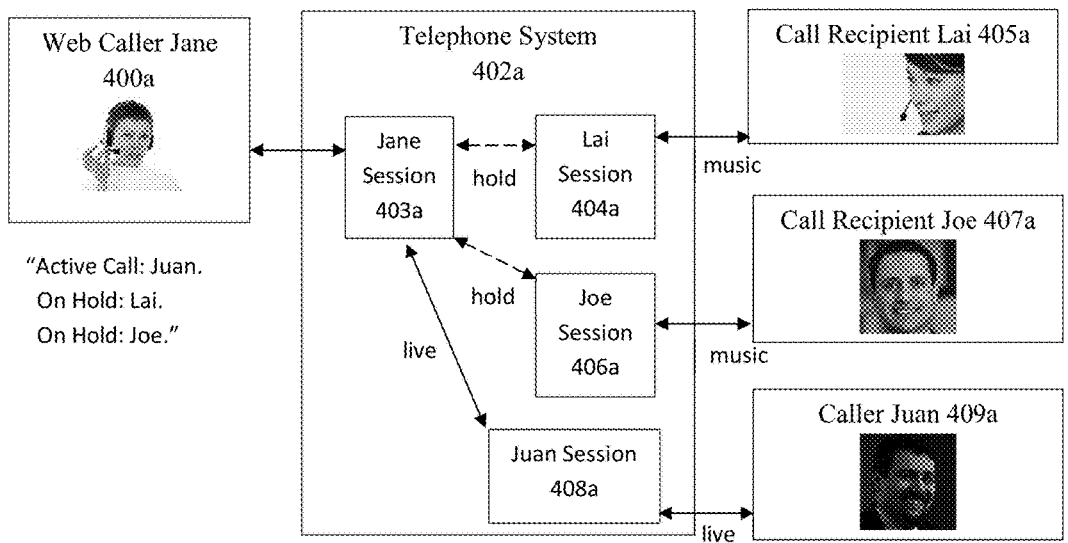
FIG. 4b shows accepting an incoming Web call

Or else, Web Caller Jane 400a may decide to take the call from Caller Juan 409a, which puts the active call with Call Recipient Joe 407a on hold, resulting in FIG. 4b.

The Telephone System 402b retains the connection to Call Recipient Joe 407b and may play "on hold" music or send other media.

Web Caller Jane 400b is now enabled to speak and trade media with Caller Juan 409b through Jane Session 403b and Juan Session 408b.

Figure 5A:
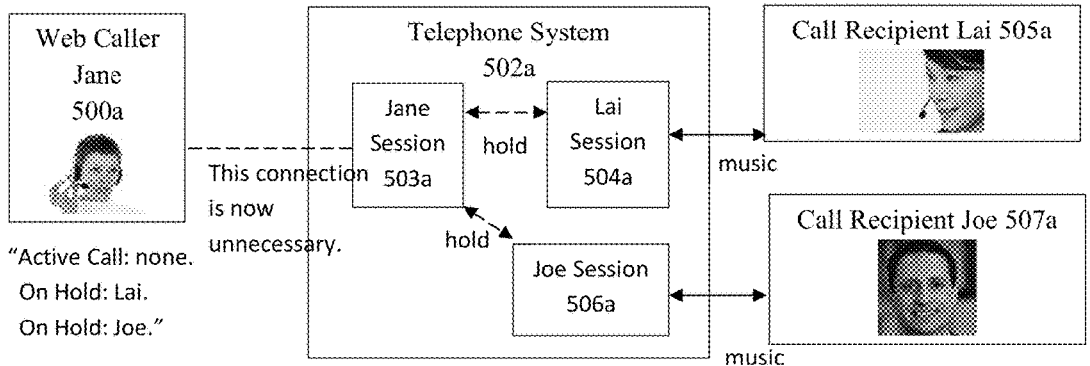
FIG. 5a shows dropping a Web call, while others are on hold.

Eventually Web Caller Jane 400a drops the call with Caller Juan 409a, resulting in FIG. 5a. The session involving Juan has ended completely. Call Recipient Lai 505a and Call Recipient Joe 507a are still connected to Telephone System 502a, but they are indicated through Jane's browser to be on hold, and they may still be receiving media such as "on hold" music or HTML code, or other automated media.

Figure 5B:
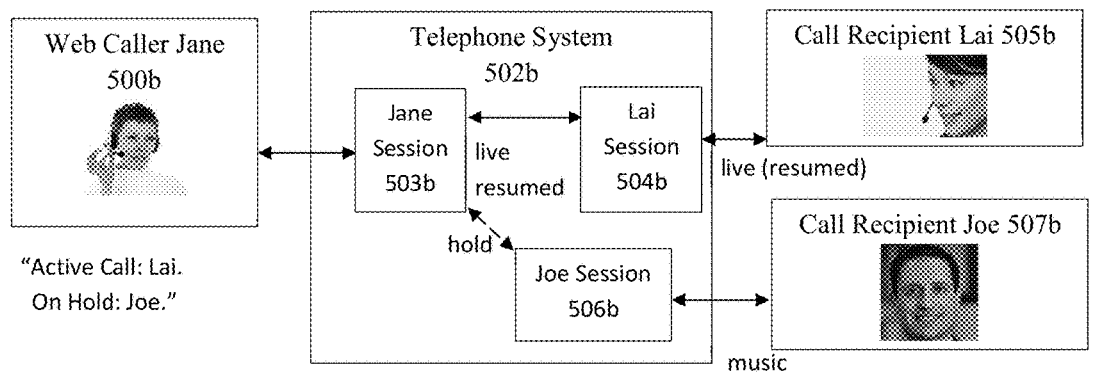
FIG. 5b shows resuming a Web call from hold.

At this point, Web Caller Jane 500b clicks her Web browser interface to remove Call Recipient Lai 505a from hold. Telephone System 502a takes Call Recipient Lai 505a off of the automated media, e.g. "on hold" music, and restores her live conversation through Jane Session 503a, resulting in FIG. 5b.

Figure 5C:
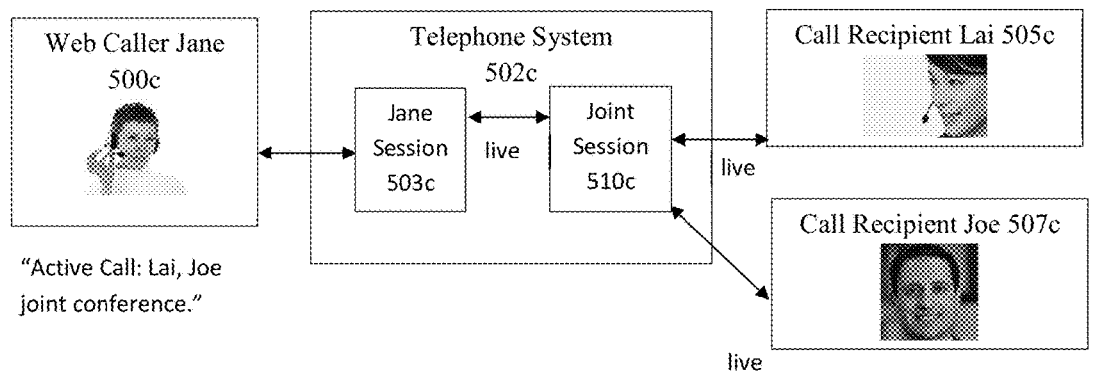
FIG. 5c shows creating a conference call from multiple Web calls.

Now Web Caller Jane 500b and Call Recipient Lai 505b can communicate again. Web Caller Jane 500b may even clicks her Web browser interface to merge the two calls (with Jane and Joe) into a single conference call. In that case, Telephone System 502b merges the Lai Session 504b and Joe Session 506b into a single Joint Session 510c, resulting in FIG. 5c.

Media Mixing

Figure 6:
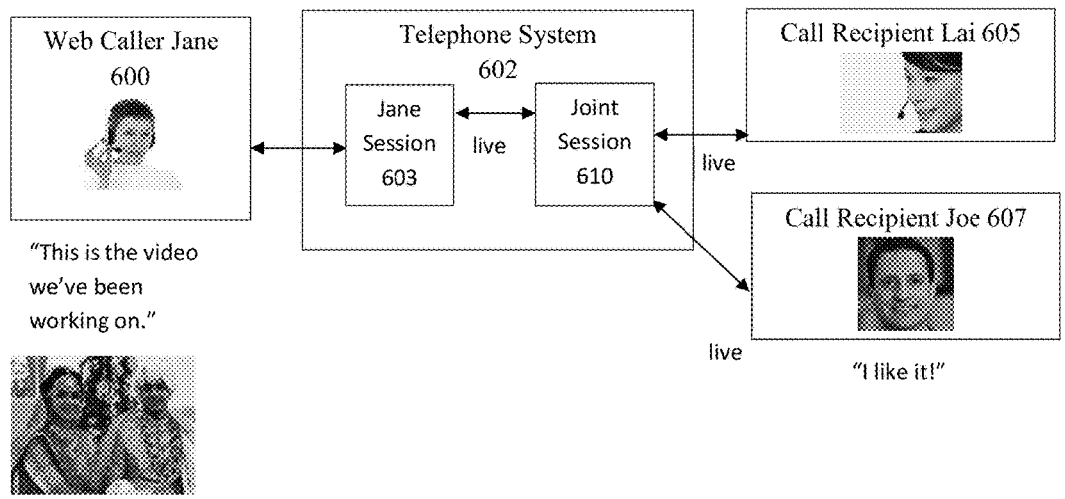
FIG. 6 shows how media is mixed during a conference call.
Figure 6:

FIG. 6. is an example of how media may be mixed during a conference call by the Telephone System 602. In this case, Jane, Lai, and Joe are all in a single call together. In one example, they may share the following media:

Web Caller Jane 600 shares video from her webcam of her face.
Web Caller Jane 600 shares the video she produced.
Web Caller Jane 600 says, "This is the video we've been working on".
Call Recipient Lai 605 shares webcam video of her face.
Call Recipient Joe 607 shares webcam video of his face.
Call Recipient Joe 607 says, "I like it!

The audio from all four parties is mixed into a single audio channel. Noise reduction may be used, and parties who are on mute optimized to have no audio channel at all.

The video from all four parties is mixed into a single video channel with four components, Mixed Video and Audio 611. Each person in the call may be able to tell the Telephone System 602 what kind of view to show, for example putting the India video foremost and not showing the three webcams.

The parties may also exchange data such as a chat conversation that is also mixed and multiplexed by the Telephone Server 602.

Codec Renegotiation

Figure 7A:
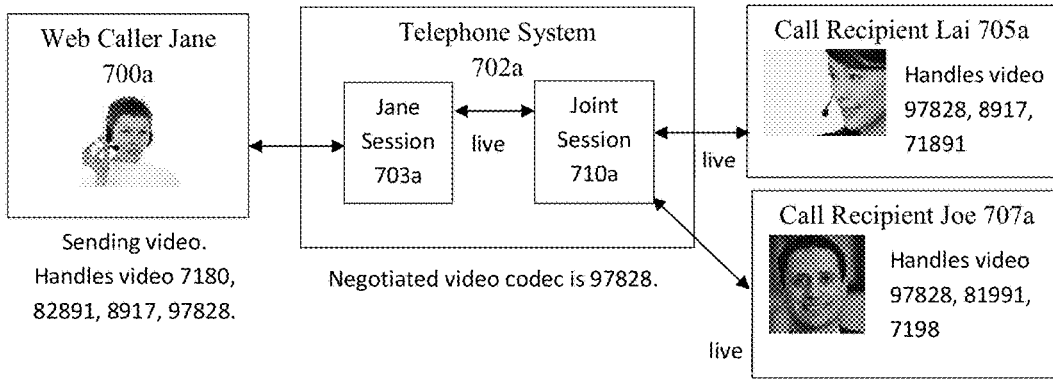
FIGS. 7a, 7b and 7c illustrate when codecs should be renegotiated.

FIG. 7a shows three parties, Jane, Lai, and Joe, in a conference call. They are all using Web calling.

Jane is sending a low-resolution video, and no one has their webcams on, so no other video is being sent. Web Caller Jane 700a uses codec 97828 on her video, so the Telephone System 702a negotiates with Call Recipient Lai 705a and Call Recipient Joe 707a to use codec 97828 also, so that the Telephone System 702a will not need to convert the video from one media format to another. This saves CPU costs.

Figure 7B:
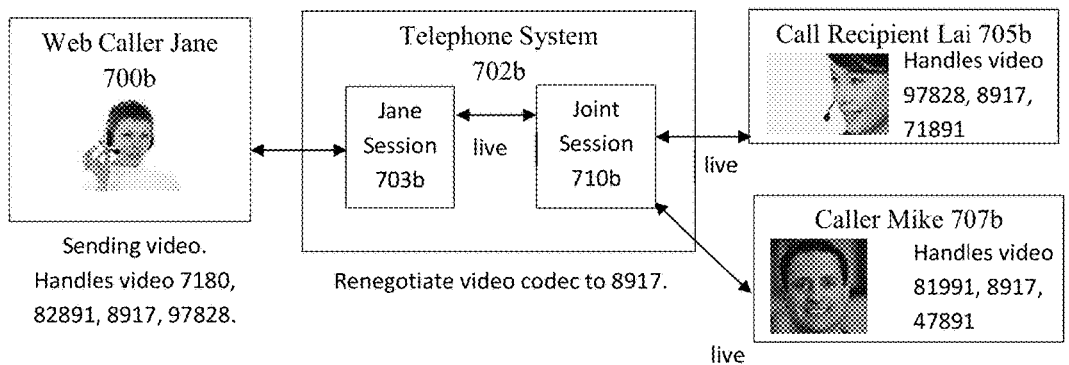

Joe drops off of the call and his twin brother Mike joins the call, resulting in FIG. 7b. Caller Mike 707b has a platform that cannot handle codec 97828. The Telephone System can convert the incoming video to a codec that Caller Mike 707b directly supports, but it may be easier to renegotiate to a new codec that all callers can handle.

Figure 7C:
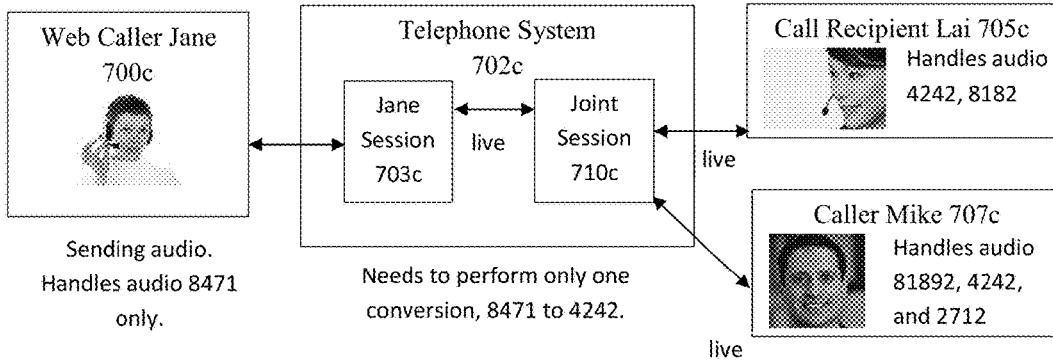

For example, Web Caller Jane ends the video and streams audio instead, resulting in FIG. 7c. She can only handle 8471. Neither Call Recipient Lai 705c nor Caller Mike 707c can handle codec 8471. Mike can only handle 81892, 4242, and 2712 audio. Lai can only handle 4242 and 8182 audio. Telephone System 702c must convert the audio coming from Web Caller Jane 700c to some format, and it chooses 4242 to minimize the amount of conversion it must do. Instead of converting 8471 to 2712 for Mike and converting 8471 to 8182 for Lai, it can do the conversion simply once from 8471 to 4242, which both Mike and Lai can handle. This saves CPU time.

In a case with dozens of callers, codec renegotiation could be done on the basis of criteria including the following:
Finding commonalities that permit the least number of media conversions,
Selecting for the codec conversions that are least CPU intensive,
Selecting for codecs that optimize call quality in latency, limited bandwidth situation, for example switching to a codec that performs well with dropped packets,
Proposing that call participants mute their microphone or video stream when such is detected to be silent or static,
Routing media through a distributed network of servers, for shorter Internet connections,
Allowing call participants to downgrade the quality of media they need to receive.

Figure 8A:
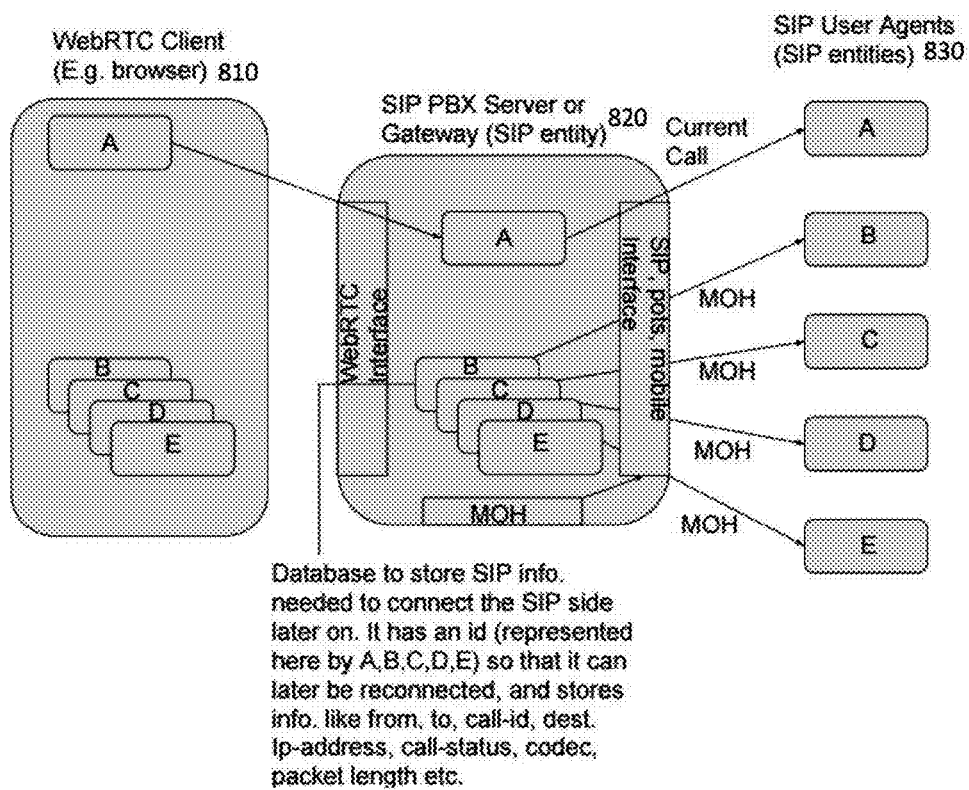
FIGS. 8a, 8b, and 8c show how the components handle calls on hold.
Figure 8B:
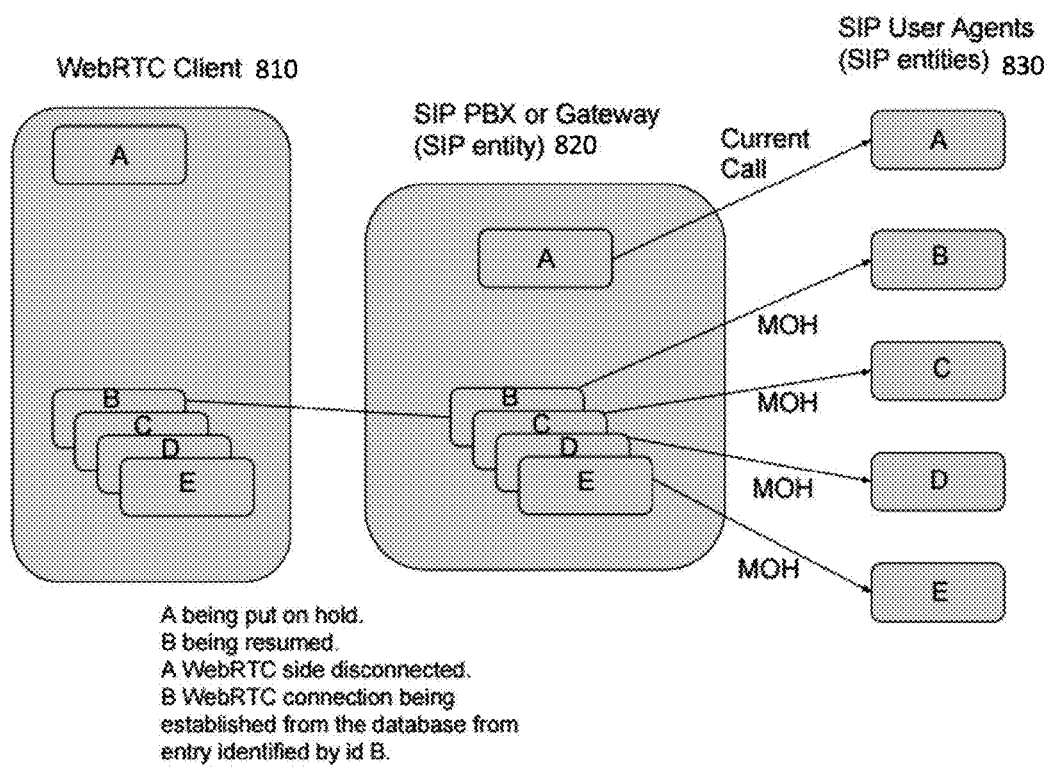
Figure 8C:
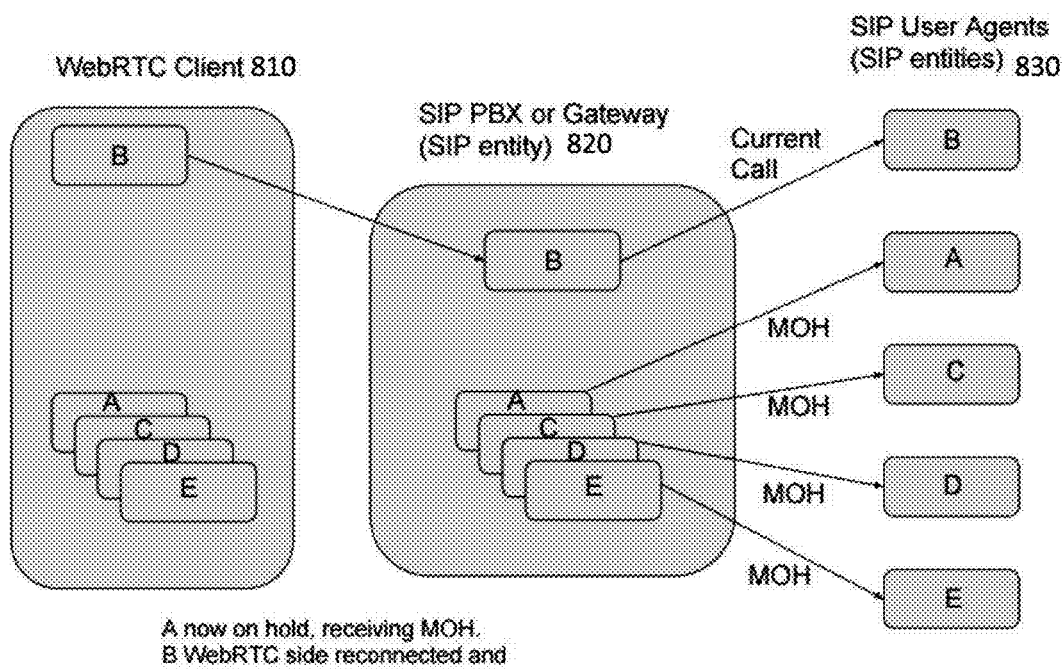

FIGS. 8a, 8b and 8c are a series of diagrams showing example components that may be used to implement the processes described above.

As shown in FIG. 8a, the system includes a WebRTC client 810, SIP PBX or gateway 820, and SIP user agents 830. The WebRTC client 810 provides the above described interfaces to a user's browser. Here there are five calls being maintained by the user indicated by the letters A, B, C, D and E.

The SIP PBX server 820 routes calls between the WebRTC client 810 and SIP user agents 830 while also maintaining a database of call information. Server 820 also includes a webRTC interface for interacting with the browser on the webRTC client 810, SIP ports, mobile interfaces and the like as well. The database stores information needed to connect the SIP user agent side when calls are placed on hold or resumed. The database may include records that each have an identifier for call (here represented by the letters A, B, C, D, E) and other information such as the from and to identifiers, caller ID, destination IP address, call status, codec(s) in use, packet length, and other parameters necessary to establish a call. A music on hold (MOH) feature may also be available to server 820.

Turning attention to FIG. 8B, call A is placed on hold and a previously held call B is to be resumed. The webRTC client side for A has already been disconnected, but the current call is still actively connected to the SIP user agent A. A new webRTC connection for call B is in the process of being established from the information retained in record B in the database.

FIG. 8C shows the remaining connections once call A is placed completely on hold (but disconnected from the SIP user agent A) and the WebRTC side is established for call B from information maintained in the database. The call information for call A is stored in the database to permit subsequent resumption of the call if requested. A live call is now in process for call B, with call A connected to music on hold.

Its should be understood that the server 820 may also include other elements such as a Web server and HTML page storage, as well as a VoIP interface and/or POTS interface, and the like, all serving functions consistent with the description above.

It should be understood that the example embodiments described above may be implemented in many different ways. In some instances, the various systems may be "data processors" as described herein, each implemented by a physical or virtual general purpose computer having a central processor, memory, disk or other mass storage, communication interface(s), input/output (I/O) device(s), and other peripherals. The general purpose computer is transformed into the processors and executes the processes described above, for example, by loading software instructions into the processor, and then causing execution of the instructions to carry out the functions described.

As is known in the art, such a computer may contain a system bus, where a bus is a set of hardware wires used for data transfer among the components of a computer or processing system. The bus or busses are essentially shared conduit(s) that connect different elements of the computer system (e.g., processor, disk storage, memory, input/output ports, network ports, etc.) that enables the transfer of information between the elements. One or more central processor units are attached to the system bus and provide for the execution of computer instructions. Also attached to system bus are typically I/O device interfaces for connecting various input and output devices (e.g., keyboard, mouse, displays, printers, speakers, etc.) to the computer. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments may therefore typically be implemented in hardware, firmware, software, or any combination thereof.

The computers that execute the processes described above may be deployed in a cloud computing arrangement that makes available one or more physical and/or virtual data processing machines via a convenient, on-demand network access model to a shared pool of configurable computing resources (e.g., networks, servers, storage, applications, and services) that can be rapidly provisioned and released with minimal management effort or service provider interaction. Such cloud computing deployments are relevant and typically preferred as they allow multiple users to access computing resources as part of a shared marketplace. By aggregating demand from multiple users in central locations, cloud computing environments can be built in data centers that use the best and newest technology, located in the sustainable and/or centralized locations and designed to achieve the greatest per-unit efficiency possible.

In certain embodiments, the procedures, devices, and processes described herein are a computer program product, including a computer readable medium (e.g., a removable storage medium such as one or more DVD-ROM's, CD-ROM's, diskettes, tapes, etc.) that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

Embodiments may also be implemented as instructions stored on a non-transient machine-readable medium, which may be read and executed by one or more procedures. A non-transient machine-readable medium may include any mechanism for storing or transmitting information in a form readable by a machine (e.g., a computing device). For example, a non-transient machine-readable medium may include read only memory (ROM); random access memory (RAM); magnetic disk storage media; optical storage media; flash memory devices; and others.

Furthermore, firmware, software, routines, or instructions may be described herein as performing certain actions and/or functions. However, it should be appreciated that such descriptions contained herein are merely for convenience and that such actions in fact result from computing devices, processors, controllers, or other devices executing the firmware, software, routines, instructions, etc.

It also should be understood that the block and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus the computer systems described herein are intended for purposes of illustration only and not as a limitation of the embodiments.

While the system and methods have been particularly shown and described with references to example embodiments thereof, it will be understood by those skilled in the art that various changes in form and details may be made therein without departing from the scope of the invention as encompassed only by the appended claims.

What is claimed is:

1. A server-based method for enabling Web browser calls, comprising the steps of:
    displaying, via a first call participant Web browser, an interface for controlling multiple calls;
    forming a first connection session to a server from the first call participant Web browser;
    forming a separate connection session from the server to an other call participant;
    connecting the first connection session and the separate session to establish a call from the first call participant and the other call participant;
    allowing the first call participant Web browser to place the call to the other call participant on hold by disconnecting the first connection session to the server from the first call participant Web browser and maintaining an automated session connection from the server to the other call participant; and
    enabling later resumption of the first connection session call by maintaining, in storage medium, parameter information related to setting up the first connection session.

2. The method as in claim 1, further comprising:
    allowing the first call participant Web browser to place a second call, while the call to the other call participant is on hold, by creating a second connection session for the second call; and
    allowing the first call participant Web browser to resume the first call on hold by making a new connection session from the server to the first call participant Web browser using the parameter information.

3. The method as in claim 1, wherein:
    the separate connection session is formed by connecting to one or more telephone networks other than a Web calling service that provides the first connection session, wherein the one or more telephone networks include one or more of VoIP networks, old telephony networks, and other Web browser call domains.

4. The method as in claim 1, further comprising:
    transmitting video and other forms of media when the second call participant is also a Web browser caller;
    transmitting data between two Web browser call participants when the second call participant is also a Web browser caller; and
    transmitting data between compatible call networks when the second call participant is not a Web browser caller; and
    transmitting a chat message via a VoIP network that supports chat when the data is a chat message.

5. The method as in claim 1, further comprising:
    providing a notification of an incoming call to the first call participant Web browser; and
    placing the call to the other call participant on hold to receive the incoming call by the first call participant Web browser.

6. The method as in claim 1, further comprising:
    forming additional separate connection sessions from the server to one or more further call participants;
    merging the first connection session and the one or more additional separate connection sessions into a multi-caller conference session; and
    mixing media from the first call participant Web browser, the other call participant, and the further call participants.

7. The method as in claim 6, further comprising:
    providing user control for the mixing of the media.

8. The method as in claim 6, further comprising:
    negotiating and renegotiating a media format for the media.

9. The method as in claim 1, further comprising:
    connecting the other call participant to an automated media connection when the call is on hold.

10. The method as in claim 1, further comprising:
    providing interactive Web browser content to the other call participant over the separate connection session when the call is on hold.

11. The method as in claim 1, further comprising:
    providing call features to the first connection session including at least codec negotiation.

* * * * *